Aug. 7, 1962    E. W. MILLER ETAL    3,048,501
PAPER PRODUCTS HAVING A COATING OF MINERAL PIGMENT IN
A BINDER OF AMMONIUM OR AMINE SALT OF A COPOLYMER OF
ACRYLIC ACID OR METHACRYLIC ACID, ACRYLAMIDE OR
METHACRYLAMIDE, AND A ($C_1$-$C_4$)-ALKYL ACRYLATE OR
METHACRYLATE, AND PRODUCTION THEREOF
Filed June 23, 1959

FIG. I

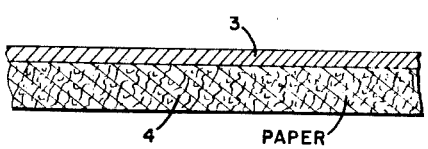

MINERAL COATING COMPRISING

1. MINERAL
2. BINDER CONSISTING ESSENTIALLY OF:
    a. 25—100 % OF AN AMMONIUM OR AMINE SALT OF A COPOLYMER OF 6—10 % OF ACRYLIC ACID OR METHACRYLIC ACID, 6—30 % OF ACRYLAMIDE*, AND 60—84 % OF A ($C_1$-$C_4$)-ALKYL ACRYLATE OR METHACRYLATE, AT LEAST 1/5 BEING A ($C_1$-$C_2$)-ALKYL ESTER, AND
    b. 0 TO 75 % OF A MEMBER SELECTED FROM THE GROUP CONSISTING OF CASEIN, SOYA-PROTEIN, STARCH, CHLORINATED STARCH, POLYACRYLATE ESTERS AND BUTADIENE-STYRENE COPOLYMERS

\* OR METHACRYLAMIDE

FIG. 2

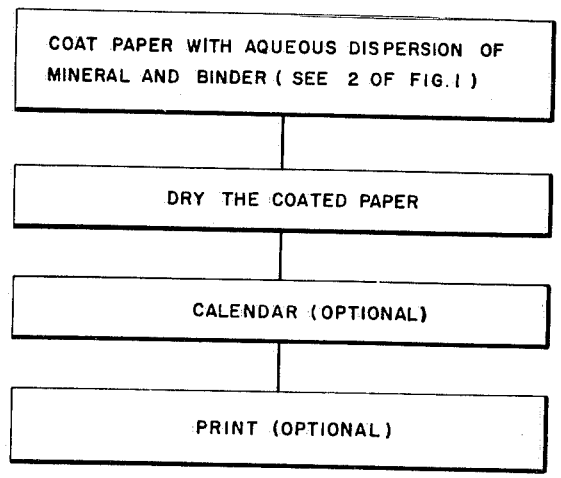

INVENTORS
EDGAR W. MILLER,
WALTER W. TOY

BY Carl A. Castellan

ATTORNEYS 3,048,501
PAPER PRODUCTS HAVING A COATING OF MIN-
ERAL PIGMENT IN A BINDER OF AMMONIUM
OR AMINE SALT OF A COPOLYMER OF ACRYL-
IC ACID OR METHACRYLIC ACID, ACRYLAM-
IDE OR METHACRYLAMIDE, AND A ($C_1$–$C_4$)-
ALKYL ACRYLATE OR METHACRYLATE, AND
PRODUCTION THEREOF
Edgar W. Miller, Levittown, and Walter W. Toy, Phila-
delphia, Pa., assignors to Rohm & Haas Company,
Philadelphia, Pa., a corporation of Delaware
Filed June 23, 1959, Ser. No. 822,197
11 Claims. (Cl. 117—155)

This invention relates to the mineral-coating of paper and to coated papers. Mineral-coating compositions, such as are commonly applied to paper body stock in the manufacture of mineral-coated paper and the like, comprise aqueous suspensions of finely-divided mineral matter, referred to herein as pigment, such as clay, calcium carbonate, blanc fixe, finely-divided metals such as aluminum, color lakes, tinctorial oxides, or the like and an aqueous dispersion or solution of an adhesive such as casein, glue, starch, or the like.

In general, mineral coatings are applied to paper to improve the appearance, the printing qualities, or other properties of the paper. The mineral-coating covers the individual fibers of the paper surface and fills interstices between fibers, thus rendering the surface of the paper more level and more uniform in texture. It is primarily the pigment content of the coating composition which provides the desirable qualities of the coating, whereas the adhesive provides chiefly the function of suitably binding the mineral matter to the paper; e.g., so that it will not be removed by the pull of printing ink during the printing operation. Nevertheless, the particular adhesive used does have considerable influence upon the working qualities of the coating composition; e.g., viscosity, flow, spreadability, etc. Likewise, the adhesive used in the coating composition has a definite effect upon the quality and appearance of the finished coated paper made therewith.

For example, the plasticity of the adhesive has a pronounced effect on the ability of the supercalender to produce a level and good printing surface.

It has heretofore been suggested to employ various water-soluble polymers, such as polymers of about 67 to 100% acrylamide and about 0 to 33% of acrylic acid, as binders in such mineral-coating compositions. However, it is necessary to include an indurating agent, such as glyoxal or a metal salt, to insolubilize the coating.

It has also been suggested to employ pigmented aqueous dispersions of such water-insoluble synthetic resinous polymers as polymerized methyl acrylate, ethyl acrylate, or butyl acrylate, or methyl or butyl acrylate copolymerized with acrylonitrile or ethyl, methyl, or butyl methacrylate. However, such polymers have been found to be insufficiently adherent to the paper to reliably resist being pulled up by the ink during printing operations. United States Patent 2,790,735 discloses and claims coated papers obtained by the application of pigmented aqueous dispersions containing 8 to 25%, on the weight of the pigment, of water-insoluble copolymers of a lower alkyl acrylate with 4 to 7% of an acid, or salt thereof, selected from methacrylic and acrylic acids. United States Patent 2,790,736 discloses and claims coated papers obtained by the application of pigmented aqueous dispersions containing 8 to 25%, on the weight of the pigment, of water-insoluble copolymers of a lower alkyl acrylate with 2.5 to 7% of an acid, or a salt thereof, selected from certain monoethylenically unsaturated polybasic acids, such as itaconic, aconitic, the dimer of methacrylic acid, the trimer of methacrylic acid, maleic acid, and fumaric acid. Another United States Patent 2,874,066 discloses and claims coated papers obtained by the application of pigmented aqueous dispersions containing 8 to 25%, on the weight of the pigment, of water-insoluble copolymers of 2.5 to 7% by weight of an unsaturated amide, such as acrylamide or methacrylamide. Aqueous dispersions of the various water-insoluble copolymers can be satisfactorily applied in large excess by an applicator roll rotating in such a direction that the surface travels opposite to the direction of travel of the sheet followed by a slowly rotating metering rod to limit the thickness of the coating. Another system involves applying excess and blowing off the excess by what is called an "air-knife." However, these water-insoluble polymer dispersions cannot be satisfactorily applied by certain conventional coaters in which the pigmented coating is applied as a viscous high-solids system to the first of a train of transfer rolls on which the composition is worked as it passes from one nip to the next until it is finally brought into contact with the paper sheet by contact therewith of the last roll of the train. This latter type of coating equipment, hereinafter referred to as a "transfer roll" coater, has the advantages of high-speed, especially with respect to drying since the high-solids system contains less solvent or vehicle to be removed during drying. However, the water-insoluble polymer dispersions produce an irregular pattern which is commonly referred to by the term "turkey-tracks." In addition, the known water-soluble synthetic addition polymers which can be applied by a transfer roll coater have either been extremely viscous at the high-solids concentration needed for this type of coater so that they are difficult to handle or have suffered from borderline adhesion to the paper.

In accordance with the present invention, aqueous alkaline pigmented coating compositions are prepared which contain certain copolymers which have a viscosity average molecular weight in the range of about 100,000 to about one million or higher and are dissolved therein. However, although the copolymers used are of soluble character, it has been found that the coated papers obtained therefrom have a surprising "wet-rub" resistance even though the copolymers are not treated with special indurating agents after application of the coating. The coating compositions of the present invention are also applicable satisfactorily by any of the types of equipment herein mentioned without turkey-tracking. Furthermore, they are characterized by the unusual combination of good adhesion of the binder to the paper and reasonable viscosity at the high-solids concentration used in transfer roll coaters.

FIGURE 1 of the drawing is a cross-section of a typical embodiment of the invention, greatly enlarged, using a coating 3 herein described on the paper substrate 4. FIGURE 2 illustrates diagrammatically a typical sequence of steps in the production of the coated product.

In accordance with the present invention, copolymers of 6 to 10% by weight of at least one acid of the formula

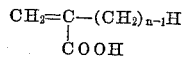

in which $n$ is an integer having a value of 1 to 2, 6 to 30% by weight of at least one amide of an acid of the aforesaid formula, and 60 to 84% by weight of at least one ($C_1$–$C_4$)-alkyl ester of an acid of the aforesaid formula, with the proviso that at least one-fifth of the ester component is a ($C_1$–$C_2$)-alkyl ester of an acid of the above formula, are dissolved in an aqueous solution of ammonia or a volatile amine, such as ethylamine, diethylamine, triethylamine, trimethylamine, ethanolamine, diethanolamine, triethanolamine, morpholine, or piperidine, to form the ammonium or amine salt of the copolymer which serves as the pigment binder and the pigment or mineral matter is then suspended or dispersed therein.

The amount of the binder in such coatings is from 8 to 25% by weight of the pigment, and is preferably 10 to 20% by weight thereof. In accordance with the present invention, the copolymer salt may constitute the entire binder of the coating composition, though the copolymer may be combined with other binder materials; the copolymer may amount to about 25% to 99% (or more) of the total weight of binder. In order to obtain the benefits and advantages peculiar to the copolymers of the present invention, the proportion thereof in any mixed binder used should be at least 25% by weight of the total binder weight and preferably is at least 50% thereof. Other binders that may be used include casein, soya-protein, starch, chlorinated starch, ethers of starch, such as hydroxyethyl-starch, and emulsion copolymers, especially of polyacrylate esters, and synthetic rubber latices, such as butadiene/styrene copolymers.

The pigments that may be employed include clays, especially of the kaolin type, calcium carbonate, blanc fixe, talc, titanium dioxide, colored lakes and toners, ochre, carbon black, graphite, aluminum powder or flake, chrome yellow, molybdate orange, toluidine red, copper phthalocyanines, such as the "Monastral" blue and green lakes. The term "mineral" in the claims is intended to cover all such types of pigmentary matter whether of strict mineral character or partly of organic material.

Copolymers in accordance with the present invention include those obtained by the copolymerization of a mixture of one or more of the lower alkyl acrylates in which the alkyl groups may have 1 to 4 carbon atoms, 6 to 10% of acrylic acid or methacrylic acid or a mixture thereof, and 6 to 30%, preferably 10 to 15%, of acrylamide or methacrylamide or a mixture thereof.

The copolymer solutions may most advantageously be made by first copolymerizing the mixture of the acid, the amide and the ester by any of the known emulsion copolymerization procedures, e.g., by first mixing the several monomers in the desired proportions into an aqueous solution of a suitable dispersing or emulsifying agent, e.g., anionic, non-ionic, or a mixture thereof, and then solubilizing the copolymer by adding ammonia or an amine to neutralize the acid copolymer either partially or completely. The molecular weight can be controlled to provide any desired molecular weight and aqueous solution viscosity in various known ways; such as by the proportion of initiator, the temperature of polymerization, or by including, e.g., about 0.05% to about 0.5% by weight, based on total monomer weight, of a chain-transfer agent during polymerization. Examples of chain-transfer agents that may be used include: long-chain alkyl mercaptans, e.g., t-do-decyl mercaptan, isopropanol, isobutanol, long-chain alcohols, e.g., lauryl alcohol, t-octyl alcohol, and halogenated hydrocarbons, e.g., $CCl_4$, $C_2Cl_4$, and $CBrCl_3$.

Examples of anionic emulsifying agents that may be used include the higher fatty alcohol sulfates, such as sodium lauryl sulfate, the alkylaryl sulfonates, such as the sodium salt of t-octylphenyl sulfonate, the sodium di-octyl sulfosuccinates and so on. Examples of the non-ionic dispersing agents that may be used for preparing the monomeric emulsions before copolymerization or dispersions of the polymer after polymerization include the following: alkylphenoxypolyethoxyethanols having alkyl groups of about seven to eighteen carbon atoms and 6 to 60 or more oxyethylene units, such as heptylphenoxypolyethoxyethanols, octylphenoxypolyethoxyethanols, methyloctylphenoxypolyethoxyethanols, nonylphenoxypolyethoxyethanols, dodecylphenoxypolyethoxyethanols, and the like; polyethoxyethanol derivatives of methylene-linked alkyl phenols; sulfur-containing agents such as those made by condensing 6 to 60 or more moles of ethylene oxide with nonyl, dodecyl, tetradecyl, t-dodecyl, and the like mercaptans or with alkylthiophenols having alkyl groups of six to fifteen carbon atoms; ethylene oxide derivatives of long-chained carboxylic acids, such as lauric, myristic, palmitic, oleic, and the like or mixtures of acids such as found in tall oil containing 6 to 60 oxyethylene units per molecule; analogous ethylene oxide condensates of long-chained alcohols, such as octyl, decyl, lauryl, or cetyl alcohols, ethylene oxide derivatives of etherified or esterified polyhydroxy compounds having a hydrophobic hydrocarbon chain, such as sorbitan monostearate containing 6 to 60 oxyethylene units, etc.; block copolymers of ethylene oxide and propylene oxide comprising a hydrophobic propylene oxide section combined with one or more hydrophilic ethylene oxide sections.

For the copolymerization, peroxidic free-radical catalysts, particularly catalytic systems of the redox type, are recommended. Such systems, as is well known, are combinations of oxidizing agents and reducing agents such as a combination of potassium persulfate and sodium metabisulfite. Other suitable peroxidic agents include the "persalts" such as the alkali metal and ammonium persulfates and perborates, hydrogen peroxide, organic hydroperoxides such as tert-butyl hydroperoxide and cumene hydroperoxide, and esters such as tert-butyl perbenzoate. Other reducing agents include water-soluble thiosulfates and hydrosulfites. Activators or promoters in the form of the salts—such as the sulfates or chlorides—of metals which are capable of existing in more than one valence state such as cobalt, iron, nickel, and copper may be used in small amounts. The most convenient method of preparing the copolymer dispersions comprises agitating an aqueous suspension of a mixture of copolymerizable monomers and a redox catalytic combination at room temperature without the application of external heat. The amount of catalyst can vary but for purposes of efficiency from 0.01% to 1.0%, based on the weight of the monomers, of the peroxidic agent and the same or lower proportions of the reducing agent are recommended. In this way, it is possible to prepare dispersions which contain as little as 1% and as much as 30% or more of the copolymer on a weight basis.

The pigment or pigments are preferably mixed and dispersed in a small amount of water before mixing with the binder. The pigment dispersion may be mixed into the aqueous polymer dispersion before or after the neutralization thereof mentioned hereinabove. When clay is used as a part of the pigment, and in preferred embodiments it forms a predominant proportion of the pigment, the dispersion is preferably adjusted to a pH of 8.5 to 9.5 to obtain the optimum dispersion of the clay.

The coating composition is applied to the paper or paperboard at a total solids concentration of about 40 to 60% by any suitable equipment, such as immersion roll and doctor system, transfer roll train, gravure roller system, brush coater, or spray coater. It may be applied to freshly prepared paper after drying, and/or conditioning. Alternatively, it may be applied during the first drying operation on the paper where it has undergone only partial drying. For example, the coating system may be mounted at an intermediate point in the drier on the paper-making machine, such as at a point where the paper has been reduced to approximately 50% moisture content.

After the coating operation, the coated sheet is dried and may then be calendered and subsequently printed. The drying may be the usual type provided in which air at about 230° to 260° F. (110° to 130° C.) is directed against the paper for thirty to forty-five seconds. The paper and coating may reach a temperature of about 180° F. (ca. 85° C.) during the drying operation. Printing may be effected by the conventional inks of precipitation type having heat-setting properties including those based on drying oils. The coated products of the present invention are receptive to single-color inks and multi-color inks of graded viscosity and are able to withstand the pull of such inks. They may be overcoated, after printing, with wax, lacquer, or other compositions. The copolymer salts of the compositions used in the present invention have excellent pigment-binding capacity and show good adhesion to the paper fibers. The compositions are adapted to be satisfactorily applied without irregular pattern-development by a wide variety of equipment including transfer-roll type in which the rolls work the composition as it is fed from nip to nip to the point of contact with the paper. The coated papers are highly resistant to pick and, surprisingly, to wet-rubbing.

The term "consisting essentially of" as used in the definition of the ingredients present in the composition claimed is intended to exclude the presence of other materials in such amounts as to interfere substantially with the properties and characteristics possessed by the composition set forth but to permit the presence of other materials in such amounts as not substantially to affect said properties and characteristics adversely.

In the following examples, which are illustrative of the present invention, the parts and percentages are by weight unless otherwise noted. The ink numbers referred to designate inks of the Institute of Printing having graded tackiness increasing from No. 1 to No. 6. In the wet-rub test used in the examples, the coated paper to be tested is lapped over a piece of glossy black paper so that a substantial area of the black paper is exposed and extends beyond the edge of the coated paper to be tested and a drop of water is applied to the coating to be tested. The index finger of the operator is drawn from the wet spot on the coating and onto the black paper with light pressure, and the procedure is repeated ten times. The water on the black paper is allowed to evaporate, and the reflection of light from the spot thereof to which any pigment is transferred from the coated sheet by the finger is measured. The higher the reflection of light, the poorer is the wet-rub resistance.

EXAMPLE 1

(a) One hundred parts of fine coating clay (kaolin) and 0.2 part of sodium hexametaphosphate were mixed in 48 parts of water, and 0.2% (on the weight of clay) of ammonimum hydroxide was added to adjust the pH to 9. The mixture thus obtained was mixed with water and an aqueous dispersion containing an emulsion copolymer having a viscosity average molecular weight of about 200,000. The copolymer dispersion was obtained by the emulsion copolymerization of a mixture of 72 parts of ethyl acrylate, 8 parts of methacrylic acid, and 20 parts of methacrylamide in about 200 parts of water in the presence of 6 parts of an emulsifier, 0.2 part of bromotrichloromethane, and a catalyst. The amount of the copolymer dispersion was chosen (36 parts) to provide 12% of copolymer on the weight of clay, and the amount of water was chosen to provide a final solids concentration of about 45% in the coating composition. After mixing the pigment and copolymer dispersions, the mixed dispersion was neutralized with ammonium hydroxide (14%) to a pH of 9.0, using about 1.5 equivalents on the acid content of the copolymer.

A dry chipboard (0.017 inch thick) was then coated with the 45% solids composition (which contained 12% of copolymer salt on the weight of pigment) by means of a train of transfer rolls the last of which contacted the travelling sheet of paper, no wiper, spreader or excess-removing device being applied after the transfer roll contact with the paper. About 2 to 3 pounds of the coating composition (dry weight) per 1,000 sq. ft. of the board was thus applied to one surface. The coated board was dried in an oven by air heated at 185° F. for a period of 45 to 60 seconds. It was then calendered by rolls at room temperature at a pressure of 50 lbs./lineal inch. The coated board showed no evidence of irregular pigmentation (turkey-tracking) and had a good, smooth surface highly receptive to ink and resistant to pick (that is removal) by inks having a tack corresponding to No. 5. Table I gives the wet-rub and pick resistance of this coating under copolymer R.

(b) Other copolymers were prepared, some with the chain-transfer agent to produce a molecular weight (L) of about 200,000 viscosity average and others without such agent to give a molecular weight (H) of about 800,000 viscosity average. The coatings obtained were tested for wet-rub resistance and for pick resistance. Table I gives the results obtained and includes copolymers A and B which do not have the composition required by the present invention and lack satisfactory wet-rub resistance (10% or lower being practical) and have inferior pick resistance, being capable only of resisting pick by the inks of lower viscosity (No. 1 and No. 2).

In the table, Cop. is the abbreviation for copolymer; EA represents ethyl acrylate; MA represents methyl acrylate; BA, butyl acrylate; MMA, methyl methacrylate; AA, acrylic acid; MAA, methacrylic acid; Am, acrylamide; and MAm, methacrylamide.

*Table I*

| Cop. | Composition (Percent by weight) |       |      |      |     |      |      |     | Mole Weight | Wet Rub Resistance (Percent Reflectance) | Resistant to Pick by Ink No. |
|------|-----|-----|----|-----|----|----|----|-----|------|------|---|
|      | Am  | MAm | AA | MAA | MA | EA | BA | MMA |      |      |   |
| A    |     |     |    | 8   |    | 92 |    |     | H    | 11   | 2 |
| B    |     | 5   |    | 8   |    | 77 |    |     | L    | 16   | 1 |
| C    |     | 6   | 8  |     |    | 86 |    |     | L    | 7.5  | 3 |
| D    |     | 6   |    | 8   |    | 86 |    |     | H    | 7    | 3 |
| E    |     | 10  |    |     | 6  | 84 |    |     | L    | 4    | 3 |
| F    |     | 10  | 6  |     |    | 84 |    |     | L    | 6    | 3 |
| G    |     | 10  |    | 6   |    | 84 |    |     | L    | 7    | 4 |
| H    |     | 10  |    | 8   |    | 82 |    |     | H    | 6    | 3 |
| I    |     | 10  | 8  |     |    | 82 |    |     | L    | 8    | 3 |
| J    |     | 10  |    | 8   |    | 82 |    |     | H    | 7    | 5 |
| K    |     | 12  |    |     | 80 |    |    |     | L    | 4    | 3 |
| L    | 14  |     |    | 8   |    | 78 |    |     | L    | 8    | 3 |
| M    |     | 14  |    | 6   |    | 70 |    | 10  | L    | 6    | 3 |
| N    |     | 15  |    |     | 7  | 68 |    | 10  | L    | 4    | 3 |
| O    |     | 15  |    |     | 8  |    | 60 | 17  | L    | 4    | 3 |
| P    |     | 10  |    | 10  |    | 80 |    |     | L    | 4.5  | 4 |
| Q    |     | 10  |    | 8   |    | 82 |    |     | L    | 7    | 3 |
| R    |     | 20  |    | 8   |    | 72 |    |     | H    | 5    | 5 |
| S    |     | 20  |    | 8   |    | 72 |    |     | L    | 5    | 5 |
| T    |     | 30  |    | 8   |    | 62 |    |     | L    | 5    | 5 |
| U    |     | 14  | 10 |     | 76 |    |    |     | L    | 7    | 3 |

EXAMPLE 2

The procedure of Example 1(a) was followed raising the amount of copolymer on the weight of pigment from 12 to 20%. The coated board was essentially the same in qualities as that obtained in Example 1(a), having a wet-rub resistance indicated by 4% reflection.

EXAMPLE 3

The procedure of Example 1(a) was repeated substituting for the copolymer a copolymer of 70% of propyl acrylate, 23% of methacrylamide, and 7% of methacrylic acid. Coated boards were similar to that of Example 1(a).

EXAMPLE 4

To a clay dispersion made as described in Example 1(a) were added different amounts of a 20% ammoniacal solution of soya-protein and of an emulsion copolymer of 78 parts ethyl acrylate, 20 parts methacrylamide, and 8 parts of methacrylic acid. The total binder content was 10% based on pigment solids. To each of the resulting mixtures there was added sufficient ammonium hydroxide to solubilize the copolymer, about 1 to 2 equivalents based on the quantity of polymerized methacrylic acid. The solids content of the coating compositions was adjusted to 55%, and they were then coated onto paper as described in Example 1(a). The following Table II summarizes the properties obtained.

*Table II*

| Coating | Binder Composition | | Wet-Rub Resistance (Percent Reflection) | Resistant to Pick By Ink No. |
|---|---|---|---|---|
| | Soya-Protein (percent) | Copolymer (percent) | | |
| A | 75 | 25 | 6 | 3 |
| B | 50 | 50 | 6 | 3 |
| C | 0 | 100 | 5 | 3 |

In the claims, the term "paper" is intended to include not only thin flexible paper webs or sheets, but also board types made of paper fibers, whether flexible or stiff.

It is to be understood that changes and variations may be made without departing from the spirit and scope of the invention as defined by the appended claims.

We claim:

1. A mineral-coated paper product comprising a paper sheet carrying on a surface thereof a dried coating of a composition comprising (1) a finely-divided pigmentary material and (2) from 8 to 25 parts by weight of a binder per 100 parts by weight of the pigment, the binder consisting of at least one member selected from the group consisting of casein, soya-protein, starch, chlorinated starch, ethers of starch, polyacrylate esters, butadiene-styrene copolymers, and salts of a member selected from the group consisting of ammonium and water-soluble volatile amines with a copolymer of 6 to 10% by weight of at least one acid having the formula $$CH_2=C-(CH_2)_{n-1}H$$
$$|$$
$$COOH$$

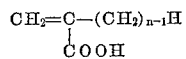

in which $n$ is an integer having a value of 1 to 2, 6 to 30% by weight of an amide of an acid of the formula, and 60 to 84% by weight of at least one lower alkyl ester of an acid of said formula in which the alkyl group has from 1 to 4 carbon atoms, at least one-fifth of the ester content of the copolymer being selected from the group consisting of $(C_1-C_2)$-alkyl esters of an acid of the formula the binder containing 25 to 100% by weight of at least one of the aforesaid salts.

2. A coated paper as defined in claim 1 in which the pigmentary material comprises a predominant proportion of clay therein.

3. A mineral-coated paper product comprising a paper sheet carrying on a surface thereof a dried coating of a composition comprising (1) a finely-divided pigmentary material and (2) from 8 to 25 parts by weight of a binder per 100 parts by weight of the pigment, the binder consisting essentially of an ammonium salt of a copolymer of about 60 to 84% by weight of ethyl acrylate, from 6 to 10% by weight of methacrylic acid, and 6 to 30% by weight of methacrylamide.

4. A mineral-coated paper product comprising a paper sheet carrying on a surface thereof a dried coating of a composition comprising (1) a finely-divided pigmentary material and (2) from 8 to 25 parts by weight of a binder per 100 parts by weight of the pigment, the binder consisting essentially of an ammonium salt of a copolymer of about 60 to 84% by weight of ethyl acrylate, from 6 to 10% by weight of acrylic acid, and 6 to 30% by weight of methacrylamide.

5. A mineral-coated paper product comprising a paper sheet carrying on a surface thereof a dried coating of a composition comprising (1) a finely-divided pigmentary material having a predominant proportion of clay therein and (2) from 8 to 25 parts by weight, per 100 parts by weight of the pigment, of a binder, consisting essentially of a salt of a member selected from the group consisting of ammonium and water-soluble volatile amines with a copolymer of 6 to 10% by weight of at least one acid having the formula $$CH_2=C-(CH_2)_{n-1}H$$
$$|$$
$$COOH$$

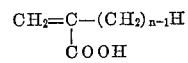

in which $n$ is an integer having a value of 1 to 2, 6 to 30% by weight of an amide of an acid of the formula, and 60 to 84% by weight of at least one lower alkyl ester of an acid of said formula in which the alkyl group has from 1 to 4 carbon atoms, at least one-fifth of the ester content of the copolymer being selected from the group consisting of $(C_1-C_2)$-alkyl esters of an acid of the formula.

6. A method of producing mineral-coated paper which comprises coating at least one side of a paper sheet with an aqueous dispersion of 40 to 60% total solids concentration, having a pH of 7 to 9.5, and containing a pigment and 8 to 25% by weight, based on the total weight of pigment, of a binder consisting of at least one member selected from the group consisting of casein, soya-protein, starch, chlorinated starch, ethers of starch, polyacrylate esters, butadiene-styrene copolymers, and salts of a member selected from the group consisting of ammonium and water-soluble volatile amines with a copolymer of 6 to 10% by weight of at least one acid having the formula $$CH_2=C-(CH_2)_{n-1}H$$
$$|$$
$$COOH$$

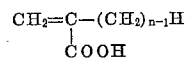

in which $n$ is an integer having a value of 1 to 2, 6 to 30% by weight of an amide of an acid of the formula, and 60 to 84% by weight of at least one lower alkyl ester of an acid of said formula in which the alkyl group has from 1 to 4 carbon atoms, at least one-fifth of the ester content of the copolymer being selected from the group consisting of $(C_1-C_2)$-alkyl esters of an acid of the formula, the binder containing 25 to 100% by weight of at least one of the aforesaid salts, drying, and calendering the coated sheet.

7. A method of producing mineral-coated paper which comprises coating at least one side of a paper sheet with an aqueous dispersion of 40 to 60% total solids concentration, having a pH of 7 to 9.5, and containing a pigment comprising a predominant proportion of clay and 12 to 20% by weight, based on the total weight of pigment, of a binder consisting essentially of a salt of a member selected from the group consisting of ammonium and water-soluble volatile amines with a copolymer of 6 to 10% by weight of at least one acid having the formula $$CH_2=C-(CH_2)_{n-1}H$$
$$|$$
$$COOH$$

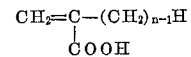

in which $n$ is an integer having a value of 1 to 2, 6 to 30% by weight of an amide of an acid of the formula, and 60 to 84% by weight of at least one lower alkyl ester of an acid of said formula in which the alkyl group has from 1 to 4 carbon atoms, at least one-fifth of the ester content of the copolymer being selected from the group consisting of $(C_1-C_2)$-alkyl esters of an acid of the formula, drying, and calendering the coated sheet.

8. A mineral-coated paper product comprising a paper sheet carrying on a surface thereof a dried coating of a composition comprising (1) a finely-divided pigmentary material and (2) from 8 to 25 parts by weight of a binder per 100 parts by weight of the pigment, the binder consisting essentially of (A) 25 to 99% by weight of a salt of a member selected from the group consisting of ammonium and water-soluble volatile amines with a copolymer of 6 to 10% by weight of at least one acid having the formula

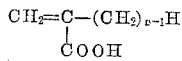

in which $n$ is an integer having a value of 1 to 2, 6 to 30% by weight of an amide of an acid of the formula, and 60 to 84% by weight of at least one lower alkyl ester of an acid of said formula in which the alkyl group has from 1 to 4 carbon atoms, at least one-fifth of the ester content of the copolymer being selected from the group consisting of ($C_1$–$C_2$)-alkyl esters of an acid of the formula, and (B) 1 to 75% by weight of at least one material selected from the group consisting of casein, alpha-protein, soya-protein, starch, chlorinated starch, starch ethers, acrylate ester cooplymers, and butadiene/styrene copolymers.

9. A mineral-coated paper product comprising a paper sheet carrying on a surface thereof a dried coating of a composition comprising (1) a finely-divided pigmentary material and (2) from 8 to 25 parts by weight of a binder per 100 parts by weight of the pigment, the binder consisting essentially of (A) 50 to 99% by weight of a salt of a member selected from the group consisting of ammonium and water-soluble volatile amines with a copolymer of 6 to 10% by weight of at least one acid having the formula

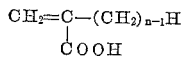

in which $n$ is an integer having a value of 1 to 2, 6 to 30% by weight of an amide of an acid of the formula, and 60 to 84% by weight of at least one lower alkyl ester of an acid of said formula in which the alkyl group has from 1 to 4 carbon atoms, at least one-fifth of the ester content of the copolymer being selected from the group consisting of ($C_1$–$C_2$)-alkyl esters of an acid of the formula, and (B) 1 to 50% by weight of at least one material selected from the group consisting of casein, soya-protein, starch, chlorinated starch, starch ethers, acrylate ester copolymers, and butadiene/styrene copolymers.

10. A mineral-coated paper product comprising a paper sheet carrying on a surface thereof a dried coating of a composition comprising (1) a finely-divided pigmentary material and (2) from 8 to 25 parts by weight of a binder per 100 parts by weight of the pigment, the binder consisting essentially of (A) 25 to 99% by weight of a salt of a member selected from the group consisting of ammonium and water-soluble volatile amines with a copolymer of 6 to 10% by weight of at least one acid having the formula

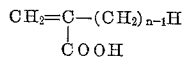

in which $n$ is an integer having a value of 1 to 2, 6 to 30% by weight of an amide of an acid of the formula, and 60 to 84% by weight of at least one lower alkyl ester of an acid of said formula in which the alkyl group has 1 to 4 carbon atoms, at least one-fifth of the ester content of the copolymer being selected from the group consisting of ($C_1$–$C_2$)-alkyl esters of an acid of the formula, and (B) 1 to 75% by weight of soya-protein.

11. A mineral-coated paper product comprising a paper sheet carrying on a surface thereof a dried coating of a composition comprising (1) a finely-divided pigmentary material and (2) from 8 to 25 parts by weight of a binder per 100 parts by weight of the pigment, the binder consisting essentially of (A) 50 to 99% by weight of a salt of a member selected from the group consisting of ammonium and water-soluble volatile amines with a copolymer of 6 to 10% by weight of at least one acid having the formula

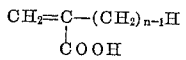

in which $n$ is an integer having a value of 1 to 2, 6 to 30% by weight of an amide of an acid of the formula, and 60 to 84% by weight of at least one lower alkyl ester of an acid of said formula in which the alkyl group has from 1 to 4 carbon atoms, at least one-fifth of the ester content of the copolymer being selected from the group consisting of ($C_1$–$C_2$)-alkyl esters of an acid of the formula, and (B) 1 to 50% by weight of soya-protein.

References Cited in the file of this patent
UNITED STATES PATENTS

| | | |
|---|---|---|
| 2,653,140 | Allenby et al. | Sept. 22, 1953 |
| 2,893,977 | Suen et al. | July 7, 1959 |